US012777333B2

(12) United States Patent
Korbis et al.

(10) Patent No.: US 12,777,333 B2
(45) Date of Patent: Oct. 27, 2026

(54) DETECTING UNAUTHORIZED TELECOMMUNICATION DEVICES AT A SECURED FACILITY

(71) Applicant: MDESS, LLC, Beavercreek, OH (US)

(72) Inventors: Je'an Nicholas Korbis, Adelaide (AU); Jeremy L. Bailey, Martinez, GA (US)

(73) Assignee: MDESS, LLC, Beavercreek, OH (US)

( * ) Notice: Subject to any disclaimer, the term of this patent is extended or adjusted under 35 U.S.C. 154(b) by 385 days.

(21) Appl. No.: 18/481,746

(22) Filed: Oct. 5, 2023

(65) Prior Publication Data

US 2025/0119744 A1 Apr. 10, 2025

(51) Int. Cl.

| | |
|---|---|
| ***H04W 12/121*** | (2021.01) |
| ***H04W 8/22*** | (2009.01) |
| ***H04W 12/72*** | (2021.01) |
| ***H04W 24/06*** | (2009.01) |

(52) U.S. Cl.

CPC ........... *H04W 12/121* (2021.01); *H04W 8/22* (2013.01); *H04W 12/72* (2021.01); *H04W 24/06* (2013.01)

(58) Field of Classification Search

None

See application file for complete search history.

(56) References Cited

U.S. PATENT DOCUMENTS

| | | | | |
|---|---|---|---|---|
| 2012/0094668 A1* | 4/2012 | Vratskides | H04W 8/06 455/435.1 |
| 2016/0284147 A1* | 9/2016 | Trani | G01S 5/02 |
| 2016/0295398 A1* | 10/2016 | Ketheesan | H04W 24/08 |
| 2021/0399811 A1* | 12/2021 | Endo | H04B 17/102 |

* cited by examiner

*Primary Examiner* — Akwasi M Sarpong
*Assistant Examiner* — Gabrielle N Dai
(74) *Attorney, Agent, or Firm* — ArentFox Schiff LLP

(57) ABSTRACT

Aspects for verifying an identification of a cellular device are disclosed. In one such aspect, a system for identifying cellular devices may comprise a box configured to provide an electronically isolated environment by blocking electromagnetic waves or radio frequency (RF) waves such that a cellular device is electronically isolated from outside the box when placed in the box. The system may further comprise one or more processors configured to cause the box to transmit, using one or more internal antennas, cellular network signals configured to emulate at least one base station of a telecommunication carrier to cause the cellular device to connect to a network set up by the base station when the cellular device is placed in the box, and in response to the cellular device attempting to gain access to the network, obtain an electronic identifier from the cellular device via the one or more cellular network signals.

23 Claims, 10 Drawing Sheets

300B

DETECTING UNAUTHORIZED TELECOMMUNICATION DEVICES AT A SECURED FACILITY

BACKGROUND

Technical Field

The present disclosure generally relates to communication systems, and more particularly, to identification and tracking of telecommunication devices within a secured facility.

INTRODUCTION

The use of contraband wireless devices, including cellular devices, tablets, etc., by users at a secured facility remains an ongoing problem. Sometimes these calls, texts or social media transmissions, etc., are innocuous policy violations at the facility. In other cases, the use of contraband wireless devices may constitute state or federal crimes. A significant number of calls and texts based on contraband devices, however, are more sinister. For example, in the context of correctional facilities, contraband wireless devices have been used by inmates to order the deaths of individuals, facilitate smuggling of controlled substances and weapons into the facility, set up means for escape attempts, initiate organized gang violence, etc.

In addition, wireless devices may be used inside a secured facility to capture confidential information inside the secured facility. For example, an IT employee may go into a secured facility and use their wireless device to leak confidential information or trade secrets. Accordingly, it is important to properly identify and track wireless devices that are entering and leaving a secured facility.

Conventional attempts to address contraband devices include a secured facility include contracting a specialized firm to take up long-term or permanent residence at the secured facility. The contractor may include its own facility-specific telecommunications network and base station to regulate all voice and data transmissions to and from the facility. Ideally, the antennas and network components are positioned such that all communications, authorized or otherwise, are routed through this internal network to confirm they are legitimate. The internal network may block transmissions from suspicious or confirmed contraband devices, and may gather information from the transmissions for investigative purposes.

One problem with this implementation is the potentially exorbitant cost to the facility of running the internal network on a 24/7 basis. Another problem is the network itself. The antennas' transmissions can "bleed" out of the facility, inadvertently blocking legitimate transmissions from citizens that happen to be driving by the facility, for example. The opposite problem may occur where the antenna power is reduced to avoid bleeding but where the reduction is sufficient to enable contraband devices to access external base stations, and hence bypass the very protections put in place to prevent this activity.

It is therefore important to develop new techniques that identify and verify the identification of cellular devices in an easy and secure manner.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Conventional solutions to identifying and tracking contraband wireless devices include retaining a contractor firm to situate itself at the facility and set up a "managed access system" (MAS) including an intermediary wireless network having base stations, monitoring equipment, etc. The MAS is a system that deploys a secure cellular umbrella over a specified area within the bounds of a secured facility to either permit or to interface with transmissions of cellular devices within the facility. For purposes of this disclosure, a MAS can include either a mobile or a fixed network, or a combination of both, including any cellular network for gathering relevant data. The base station's antennas are directed and powered to cover the facility grounds. Inmates may often attempt to possess and use contraband wireless devices including cellular telephones, disposable phones, and even tablets and personal computers (PCs) over the wireless network for voice calls, texts, instant messages, VOIP transmissions, and the like. Ideally, the MAS authorizes legitimate calls from pre-authorized phones, etc. and intercepts unauthorized transmissions. The MAS may include a central facility on the premises using servers to gather and process information about the unauthorized transmissions, to add devices to the contraband list, and to facilitate investigative efforts of the facility staff into related illegal activities.

This present solution can be prohibitively expensive. For one, the facility must be monitored on a 24/7 basis. The maintenance of the equipment and contracted staff likely burdens the allotted budgets of these facilities. Technical challenges also must be addressed. Examples include where the antennas from the base station at the facility inadvertently "bleed" to regions outside the facility to prevent legitimate calls from being intercepted or cut off. Similarly, the facility may include spotty regions where inmates can access external base stations using contraband devices. The problems are exacerbated in an urban environment, where the potential number of networks and individuals near the facility increase.

Aspects of the present disclosure overcome the above-stated problems and other shortcomings with this approach.

In an aspect of the disclosure, a method, system, and apparatus are provided. The apparatus for identifying cellular devices may include a box configured to provide an electronically isolated environment by blocking electromagnetic waves or radio frequency (RF) waves such that a cellular device is electronically isolated from outside the box when placed in the box, where the box comprises one or more internal antennas and a status indicator. The apparatus may also include a base station coupled to the box via one or more RF cables, where the base station comprises one or more scanning antennas. The apparatus may further include one or more processors configured to: identify, using the one or more scanning antennas, networks in an area of interest, cause the box to transmit, using the one or more internal antennas, one or more cellular network signals configured to emulate at least one base station of a telecommunication carrier to cause the cellular device to attempt to connect to a network set up by the base station when the cellular device is placed in the box, where the one or more cellular network signals may be determined based on the identified networks, and obtain, in response to the cellular device attempting to gain access to the network, an electronic identifier from the cellular device placed in the box via the one or more cellular network signals.

In another aspect of the disclosure, an apparatus is provided. The apparatus for identifying cellular devices may include a box configured to provide an electronically isolated environment by blocking electromagnetic waves or radio frequency (RF) waves such that a cellular device is electronically isolated from outside the box when placed in the box, where the box may comprise one or more internal antennas, one or more scanning antennas, and one or more processors. The one or more processors may be configured to: generate a virtual base station configured to emulate at least one base station of a telecommunication carrier, identify, using the one or more scanning antennas, networks in an area of interest, cause the box to transmit, using the one or more internal antennas, one or more cellular network signals configured to cause the cellular device to attempt to connect to a network set up by the virtual base station when the cellular device is placed in the box, where the one or more cellular network signals may be determined based on the identified networks, and obtain, in response to the cellular device attempting to gain access to the network, an electronic identifier from the cellular device placed in the box via the one or more cellular network signals.

In still another aspect of the disclosure, a method is provided. The method includes receiving a cellular device in a box configured to provide an electronically isolated environment by blocking electromagnetic waves or radio frequency (RF) waves such that a cellular device is electronically isolated from outside the box when placed in the box, where the box may comprise one or more internal antennas. The method also includes generating a virtual base station configured to emulate at least one base station of a telecommunication carrier. The method also includes identifying, using one or more scanning antennas coupled to the box, networks in an area of interest. The method also includes causing the box to transmit, using the one or more internal antennas from the box, one or more cellular network signals configured to cause the cellular device to attempt to connect to a network set up by the virtual base station when the cellular device is placed in the box, where the one or more cellular network signals may be determined based on the identified networks. The method further includes obtaining, in response to the cellular device attempting to gain access to the network, an electronic identifier from the cellular device placed in the box via the one or more cellular network signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
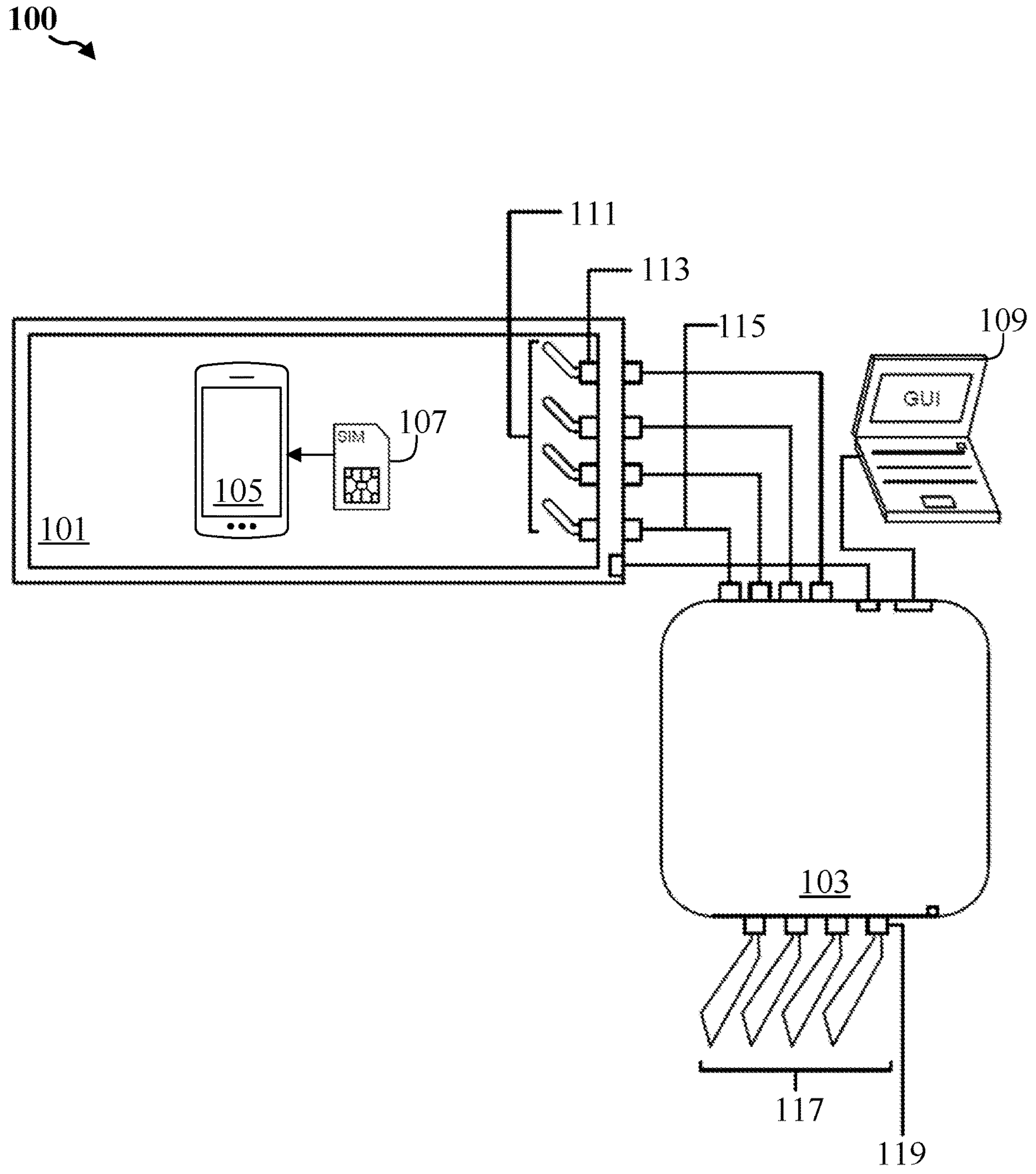
FIG. 1 is a diagram illustrating an example of an identification system for identifying cellular devices according to an embodiment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), Software defined Radio (SDR), Power Amplifiers (PA), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

As used herein, the terms "cellular device," "telecommunication carrier devices," "wireless devices", "user equipment" (UE), and "base station" are not intended to be specific or otherwise limited to any particular Radio Access Technology (RAT), unless otherwise noted. In general, a cellular device, telecommunication carrier device, wireless device, or UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle, Internet of Things (IoT) device, etc.) used by a user to communicate over a wireless communication network. A UE may be mobile or may (e.g., at certain times) be stationary, and may communicate with a Radio Access Network (RAN). As used herein, the terms "cellular device," "mobile device", "telecommunication carrier device," "wireless terminal", or "UE" may be referred to interchangeably as an "access terminal" or "AT", a "client device", a "wireless device," a "subscriber device," a "subscriber terminal", a "subscriber station," a "user terminal," a "mobile terminal," a "mobile station", or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may alternatively referred to as an access point (AP), a network node, a NodeB, an evolved NodeB (eNB), a New Radio (NR) Node B (also referred to as gNB or gNodeB), etc. In addition, in some systems, a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.).

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. Various aspects of the present disclosure describe identifying and/or verifying the identify of cellular devices using a simple UI. For example, an identification system for cellular devices may be deployed at a secured facility such as an inmate correctional facility, schools, psychiatric hospitals, or classified laboratories or buildings. Conventional techniques rely on a contracting firm placing a permanent network at a secured facility. As an example, a base station and related server system is established as part of a managed access system (MAS) deployed at a correctional facility. One significant disadvantage with this approach is the potentially exorbitant expense to the facility to have a permanent firm performing this cellular contraband regulation 24 hours a day, seven days a week for a possibly indefinite period. Additional shortcomings relate to the problems that occur when the network inadvertently "bleeds" into the surrounding area, resulting in civilians' cellular equipment being affected by the prison network. If the contracting firm attempts to fix this problem (particularly in an urban environment involving other base stations in the proximity of the facility) by reducing the transmission and receive power of the on-site base station(s), then it may become possible for inmates to reach external base stations using contraband phones. The inmates may then altogether bypass the restrictions in place.

According to one aspect of the disclosure, an apparatus (e.g., telecommunications recordings and collection equipment (TRACE) box) may contain a base station or deploy a virtual base station to emulate a base station of a telecommunication carrier to extract electronic identifiers from a cellular device. In the aspects disclosed herein, the apparatus may include a shielded box for receiving a cellular device such that the cellular device is electronically isolated from an outside environment when placed inside the box. Once the cellular device is electronically isolated from the environment, the apparatus interrogates the cellular device for its electronic identifiers by causing the cellular device to connect to a network set up by the base station or virtual base station. This causes the cellular device to attempt to connect to the network and, in the process, transmit its electronic identifiers to the apparatus. In addition, the apparatus may also determine whether the cellular device in the box is a known device or a unknown device by comparing the obtained electronic identifiers with a database of known devices (e.g., registered devices).

The apparatus provides a simple and reliable way to identify and/or verify the identity of cellular devices using their electronic identifiers. Since the electronic identifiers cannot be easily falsified or manipulated, a user of the apparatus can easily and quickly identify any cellular devices by simply placing the cellular device in the shielded box. Additionally, the apparatus is very simple to use because all an operator of the apparatus has to do is to place a cellular device inside of a shielded box and press a button to operate the identification process. This makes the identification process virtually fool proof. This eliminates the need for a contractor to actively monitor and detect wireless devices, as in conventional solutions. This may result in a large cost savings to the secure facility. Also, the concerns of "bleeding" spurious, interfering transmissions outside the facility may largely eliminated because the contractor no longer has a need for a base station at the facility.

Furthermore, the identification system may be coupled to a cellular device logging or monitoring system such that when a cellular device is placed within the shielded box, the logging or monitoring system can automatically extract electronic identifiers from the cellular device and log the cellular device. This makes it so that the identity of a cellular device cannot be easily manipulated or falsified by an operator when creating a profile for the cellular phone or a log entry for the cellular device.

It should be noted that, while the entity managing the data collection and subsequent duties is referenced herein as a "contractor" or "contracting firm" purely for convenience, this reference is not intended to have any legal significance, and is not intended to limit the disclosure in any way. Thus, for example, the contractor need not be contracted by the carrier to perform the activities herein.

FIG. 1 is a diagram illustrating an example of an identification system 100 that may be deployed to identify cellular devices. The purpose of the identification system is to easily and reliably identify cellular devices by creating a condition within an enclosed and shielded box that causes the cellular devices to connect to a base station provided by the identification system and then extract wireless identifiers from the cellular devices. The extracted wireless identifiers may then be used to further extract an identification information of the cellular devices for identification or logging purposes.

In some examples, the identification system 100 be strategically placed in the entrances and exits of a secured facility in order to identify and track cellular devices that are used within the secured facility. In some examples, the identification system 100 may be mobile or portable (i.e., capable of being moved through different geographical positions). It should be noted that FIG. 1 is not drawn to scale. Rather, its components are minimized to avoid unduly obscuring the concepts of the disclosure.

As shown FIG. 1, the identification system 100 comprises at least a shielded box 101 configured to create an RF containment space or block electromagnetic waves, one or more processors, and, optionally, a base transmission station (base station) 103 and/or external device or computing device 109. The identification system 100 has a shielded box 101 that is configured to receive at least one cellular device 105 and uses one or more internal antennas 111 to emulate a base station of a telecommunication carrier (e.g., Verizon, T-Mobile, AT&T, or the like), which causes a communication between the at least one cellular device 105 and the base station 103. Upon activation of the identification system 100, the at least one cellular device 105 will attempt to connect to a network set up by the base station 103 and, in turn, transmit an electronic identifier to the identification system 100 when connecting with the network. The identification system 100 may further derive a make, model, or manufacturer of the cellular device 105 from the electronic identifiers. This ensures that the identity of the cellular device 105 is verified.

The shielded box 101 comprises one or more internal antennas 111, internal SMA connectors 113, and, optionally, a status indicator (not pictured). The shielded box 101 is configured to provide an electronically isolated environment by blocking electromagnetic waves or radio frequency (RF) waves. This means that when a cellular device 105 is placed inside the shielded box 101, the cellular device 105 is electronically isolated from the outside environment. The shielded box 101 should be isolated to determine with certainty that the electronic identifiers extracted from the cellular devices 105 belong to the cellular devices 105 that are placed inside the shielded box 101. If the shielded box 101 was not isolated from the outside environment, then the identification system 100 would not be able to say with certainty that the electronic identifiers belong to the cellular device 105 placed inside the shielded box 101. In addition, the shielded box 101 is isolated to stop other carrier signals from interfering with the cellular devices 105 inside the shielded box 101 and to ensure that the base station 103 is not communicating with other devices outside of the shielded box 101. In some examples, the shielded box 101 may be a Faraday cage. In some examples, the identification system 100 may also include a status indicator, which may be a LED, a stack light, or a display.

In some examples, the shielded box 101 may be electrically and physically tamperproof. Since the shielded box 101 may be deployed in a secured facility such as a correctional facility, the identification system 100 should be ruggedized and tamperproof to prevent the identification system from being sabotaged. For instance, the identification system 100 may contain tamperproof screws and/or have screwing mechanisms made out of titanium or stainless steel. In some examples, the interior of the identification system 100 may be constructed out of aluminum and the exterior box may be made out of a black polycarbonate.

Optionally, the identification system 100 may include a base station (e.g., transmitter-receiver) 103. The base station 103 comprises one or more scanning antennas 117 and one or more external SMA connector 119. In some examples, the base station 103 is connected to the one or more internal antennas 117 via RF cables 115. The one or more scanning antennas 117 are configured to identify networks in an area of interest in order to determine transmission for inside the shielded box 101. In some examples, the identification system 100 comprises one or more processors configured to implement a virtual base station. In some examples, the base station 103 may be coupled via a backhaul connection to additional network equipment, including server and gateway.

In some examples, the identification system 100 may include a memory configured to store identifying data of identified wireless devices, one or more base stations and one or more antennas, a processing system to emulate a base station to transmit a signal to wireless devices and to carry out various computation functions of the system, and a housing that encompasses the device to prevent tampering or sabotage. The one or more base stations typically carries out the various transmission and reception functions of the identification system 100. The processing system carries out various computation functions of the identification system 100.

Data collection during interrogation. The raw data collected by the identification system 100 from the transmitting cellular devices 105 may include metadata included with various message. Other relevant identifying data that may be transmitted from different wireless devices includes IMSI (International mobile subscriber identity), IMEI (International mobile equipment identity), GUTI (Globally unique temporary ID), SMS (Short message service), and other relevant data not limited to this list.

An IMSI is a unique number that is attached to a SIM card 107 and is used to identify the subscriber and services assigned to the subscriber. Accordingly, if a user transfer their SIM card 107 from one cellular device to another cellular device, the IMSI number from the previous cellular device will be carried over to the replacement cellular device that has been inserted with the SIM card.

An IMEI is a unique identifier for a cellular device that is the IMEI is attached to and is used to identify the cellular device 105. Since IMEI numbers are unique to a cellular device and cannot be easily changed, the IMEI numbers are useful in tracking and recovering lost or stolen phones. In addition, there is a global registry that contains all IMEI numbers such as Equipment Identification Register (EIR) that can be used to identify the cellular device and, therefore, identify an owner of the cellular device.

The equipment Identity Register (EIR) is a network database that stores lists of IMEI numbers. This database is used to manage valid IMEIs on the network so that stolen cellular devices or cellular devices of the wrong type would not be able to connect to the network. When a cellular devices is switched on, its unique IMEI number is transmitted to the network and checked against the EIR, which determines whether the cellular device can log onto the network to initiate and receive calls.

When a cellular device attaches to a network, the cellular device sends a signal to the network containing both IMSI and IMEI information. The IMSI is used for location update of the VLR/HLR registers, whereas the IMEA is used for checking of invalid equipment in the EIR repository. In addition, the cellular device will register the IMEI on the network along with the IMSI (if a SIM card is inserted). In some examples, the IMEI and IMSI is also being used by some applications and smartphone Operating systems for identification and is being tracked. For example, a mobile operator subscriber log may store the IMEI along with the IMSI and their subscriber information database. If a user uses a pre-paid anonymous SIM card (e.g., anonymous IMSI but with a known IMEI), the mobile operator may see that the cellular device belonged to a particular person if the person used that cellular device before with a different SIM (e.g., different IMSI but same known IMEI).

There may be several different methods of obtaining electronic identifiers from a cellular device by causing the cellular device to perform an attach process to a network provided by a base station of the identification system. For example, the cellular device must be placed inside the shielded box in order to electronically isolate the cellular device from an outside environment and cause the shielded box to transmit, using one or more internal antennas, cellular network signals configured to emulate a base station of a telecommunication carrier to cause the cellular device to attempt to connect to the network provided by the base station. It should be noted that there are several methods for a cellular device to attach to different RATs, but a few specific attach procedures will be explained below for illustrative purposes only.

When a cellular device has been enticed to register with an identification system, the cellular device may be interrogated for its IMSI. Many interrogation techniques can be derived directly from a reading of the cellular standard. In the case of Global System for Mobile communication (GSM), Universal Mobile Telecommunications Systems (UMTS), fourth generation long-term evolution (4G/LTE), fifth generation New Radio (NR), and 6G wireless device, the International Standard Mobile Identifier (IMSI), the Temporary Mobile Standard Identifier (TMSI), and the equipment electronic serial number (IMEI), the LTE Globally Unique Temporary ID GUTI, Subscription Concealed Identifier (SUCI) can be queried. For example, GUTI comprises of two main components, Globally Unique Mobility Management Entity Identifier (GUMMEI), which uniquely identifies a MME, and Mobile Temporary Mobile Subscriber Identity (M-TMSI), which identifies a user. As another example, SUCI is a unique identifier designed to protect the privacy of the subscriber's identity and is generated by the UE using an Elliptic Curve Integrated Encryption Scheme (ECIES)-based protection scheme.

Figure 2:
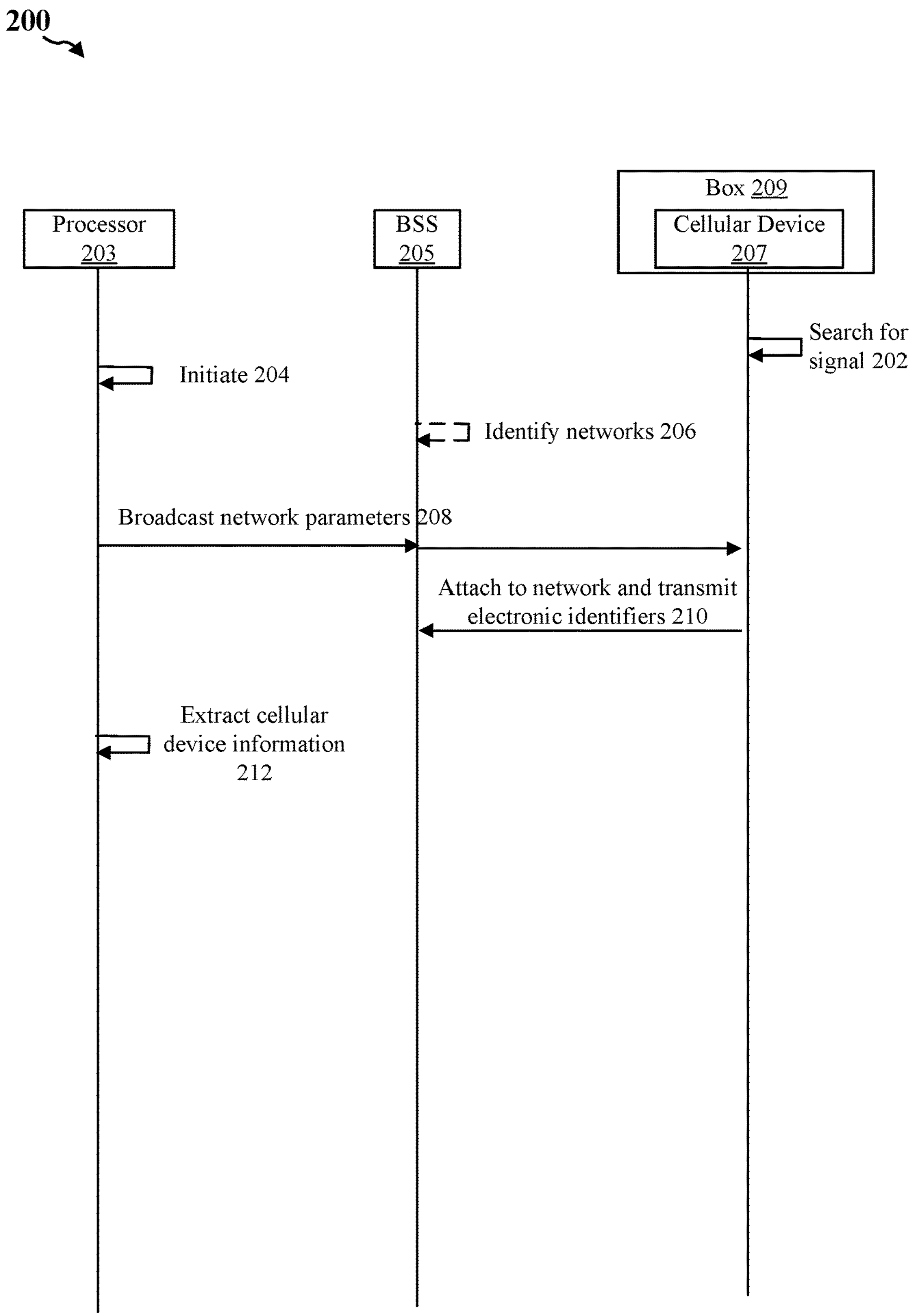
FIG. 2 is a call flow diagram of an example identification process between an identification system and a cellular device placed within a shielded box according to an embodiment.

FIG. 2 is a call flow diagram of an example identification process between an identification system 200 and a cellular device 207 placed within a shielded box 209 according to an embodiment. Optional aspects are illustrated in dashed lines.

Specifically, FIG. 2 shows an identification process for a wireless device using a general Attach Procedure. The Attach Procedure may be different depending on which RAT network the cellular device is attempting to attach to. However, the overall goal of the Attach Procedure for each RAT is the same, which is to register a cellular device 301 to the network such that the cellular device 301 is able to register with the network to receive services. Accordingly, the identification system will invoke the Attach Procedure to obtain an electronic identifier, via an update location, from the cellular device 301.

At step 202, the cellular device 207 is placed in a shielded box 209 such that the cellular device 207 is electronically isolated from an outside environment and will search for a network to connect to.

At step 204, the processor 203 will initiate the identification process and emulate at least one base station of a telecommunication carrier to cause the cellular device 207 to attempt to connect to a network set up by the base station 205 when searching for a network.

Optionally, at step 206, the base station 205 will identify the networks in the area and decide the best transmissions to transmit inside the shielded box 209. The base station 205 may scan the networks periodically to determine whether there has been any changes in the RF footprint for commercial carriers. For example, the scanning process may be performed once a month.

At step 208, the processor 203 will cause internal antennas in the shielded box 209 to broadcast network parameters to cause the cellular device 207 to send a request to connect to a network setup by the base station 205. In some examples, the one or more cellular signal may be transmitted on one or more RAT to cause the cellular device 207 to attempt to connect to the network setup by the base station 205.

At step 210, the cellular device 207 will attach to the network and transmit its electronic identifiers as a result of attempting to connect to a network provided by the base station 205. As examples, a few different ways that the network may obtain electronic identifiers from the cellular device include through an IMSI attach, or location updating. Here, the electronic identifier will generally include at least a IMSI, which may be used as an electronic identifier of the cellular device 207. The IMSI is a number that uniquely identifiers every user of a cellular network. It is stored as a 64-bit field and is sent by the cellular device to the network.

At step 212, the processor 203 may extract additional cellular device information from the electronic identifier. As an example, the processor 203 may extract a make, model, or manufacture of the cellular device 207 using a Type Allocation Code (TAC) according to the IMEI of the cellular device.

As discussed above, there are several different methods for a network to obtain electronic identifiers from a cellular device.

To make it possible for a mobile subscriber to receive a call, the network must know where the cellular device is located. Accordingly, to keep the network updated on a location of the cellular device, the network system is informed by the cellular device on a regular basis. This process is called Location Updating. For example, the location update may occur in the following cases: (1) the cellular device detecting that it is in another location area (different location area code (LAC)) (e.g., when the cellular device is placed in a shielded box), or (2) the network requires the cellular device to perform location update at regular intervals.

Accordingly, the identification system may emulate a network provider and force the cellular device to transmit a location update process by placing the cellular device into a shielded box because once the cellular device is placed in the shielded box then the cellular device will be forced to perform a location update. There are three different types of location updates: normal, periodic registration, and IMSI attach/detach.

Normal Location Updating

In normal location updating, the location is initiated by the cellular device when it detects that it has entered a new location area (e.g., placed in the shielded box). The cellular device then listens to the system information, compares the Location Area Identity (LAI) to the one stored in the cellular device on the SIM card (on BCCH channel if idle or SACCH channel if active) and detects whether it has entered a new location area or is still in the same location area. If the broadcast LAI differs from the one stored on the SIM card, the cellular device must perform a normal location update procedure.

First, the cellular device sends a channel request message including the reason for the access. Next, the message received by the base stations is forwarded to the BSC. The BSC allocates an SDCCH, if there is one idle, and tells the BTS to activate it. The cellular device is now told to tune to the SDCHH. Here, the cellular device send a location updating request message that contains the identity of the cellular device, the identity of the old location are and the type of updating. At this point, the identification system will know the identity of the cellular device through the IMSI and/or IMEI.

Periodic Registration Location Updating

Periodic registration location may be used to reduce unnecessary paging of a cellular device that has left the coverage area (e.g., placed in a shielded box). First, the cellular device listens on the BCCH to specify if Periodic Registration Location Update is used in the cellular device. If periodic registration is used, the cellular device is told how often it must register. The frequency of periodical location update is controlled by the network, or according to the T3212 parameter. The T3212 is a decimal number within the range of 0 to 255 in the units of six minutes. For example, if the parameter is set to ten, then the cellular device must register every hour.

Both the cellular device and the MSC have the timer which controls the procedure. When the timer in the cellular device expires, the cellular device performs a location updating, type periodic registration. After that, the timers in the cellular device and MSC restart. The periodic registration timer is implemented in the cellular device, and will be reinitiated every time the cellular device returns to idle mode after being in dedicated mode.

IMSI Attach/Detach:

The IMSI attach/detach operation is an action taken by a cellular device to indicate to the network that it has entered into idle mode/inactive state. When a cellular device is powered on, an IMSI and/or IMEI attach message is sent to the MSC/VLR.

An example of an attach procedure is a GSM attach procedure. When a GSM cellular device is placed inside the box, the base station will emulate a network provider because the GSM cellular device will try to connect to whatever base station is broadcasting at the highest signal strength. Since the GSM cellular device is electronically isolated into the box, the only base station that will be broadcasting a network is the base station provided by the identity system 100. Once the GSM cellular device has identified the base station as having the best (e.g., in this case, the only) signal strength, the GSM cellular device begins negotiating a connection to the base station. The base station will first ask the GSM cellular device to send its encryption capabilities. After this step, the base station transmits an Identity Request to the GSM cellular device to collect the IMSI of the GSM cellular device. The GSM cellular devices responds with its IMSI because the IMSI is stored on the SIM card, which was issued by a mobile carrier, and the phone network needs to identify that the owner/user of the GSM cellular device is in fact a paying customer (e.g., subscriber) associated with the mobile carrier.

The identification system 100 may invoke a GPRS Attach procedure by which a Mobile Station (MS) registers (e.g., connects) to a GPRS network set up by a base station of the identification system. During the GPRS Attach procedure, when the MS makes an attach procedure for the first time, the MS will identify itself to the network using an IMSI. In other words, the GPRS Attach procedure enables the network (e.g., identification system 100 from FIG. 1) to know about the identify and existence of a cellular device 301.

When an MS powers on within network coverage, it starts by scanning all frequencies within its allocated band (e.g., 124 for standard GSM). It measures the received power on each of these frequencies and places them in order. The MS then selects and listens on the strongest RF level carrier for a frequency correction burst which is transmitted on the control channel of a BCCH carrier. This is to initially achieve frequency synchronization with the transmitting base station.

Having achieved frequency synchronization, the MS listens on the SCH for frame synchronization information. The SCH channel provides frame timing, the current frame number and BSIC information.

Once frame synchronization is achieved, the MS starts to read and decode the additional information being transmitted on the BCCH. This includes the adjacent cell list, minimum received signal strength, the LAI and beacon frequencies from surrounding cells. The MS then continues to monitor the PCH for incoming call paging requests, sends periodic location updates and maintains a record of surround cell signal strengths. If the MS fails to detect either the FCCH or the SCH, it will reselect the highest RF carrier level from its measured list and repeats the detection process.

The MS sends a message to the BSS on the random access channel (RACH) requesting a channel allocation. The BSS responds with a “Immediate Assignment” message on the access grant channel (AGCH). This message assigns a SDCC channel to the MS.

On assignment of the SDCCH, the MS sends an IMSI attach message over the SDCCH to the MSC/VLR relayed via the BSS. This informs the MSC/VLR of the MS’s IMSI. This information may also be updated in the HLR which provides subscriber profile data to the VLR if it does not already have it.

Figure 3A:
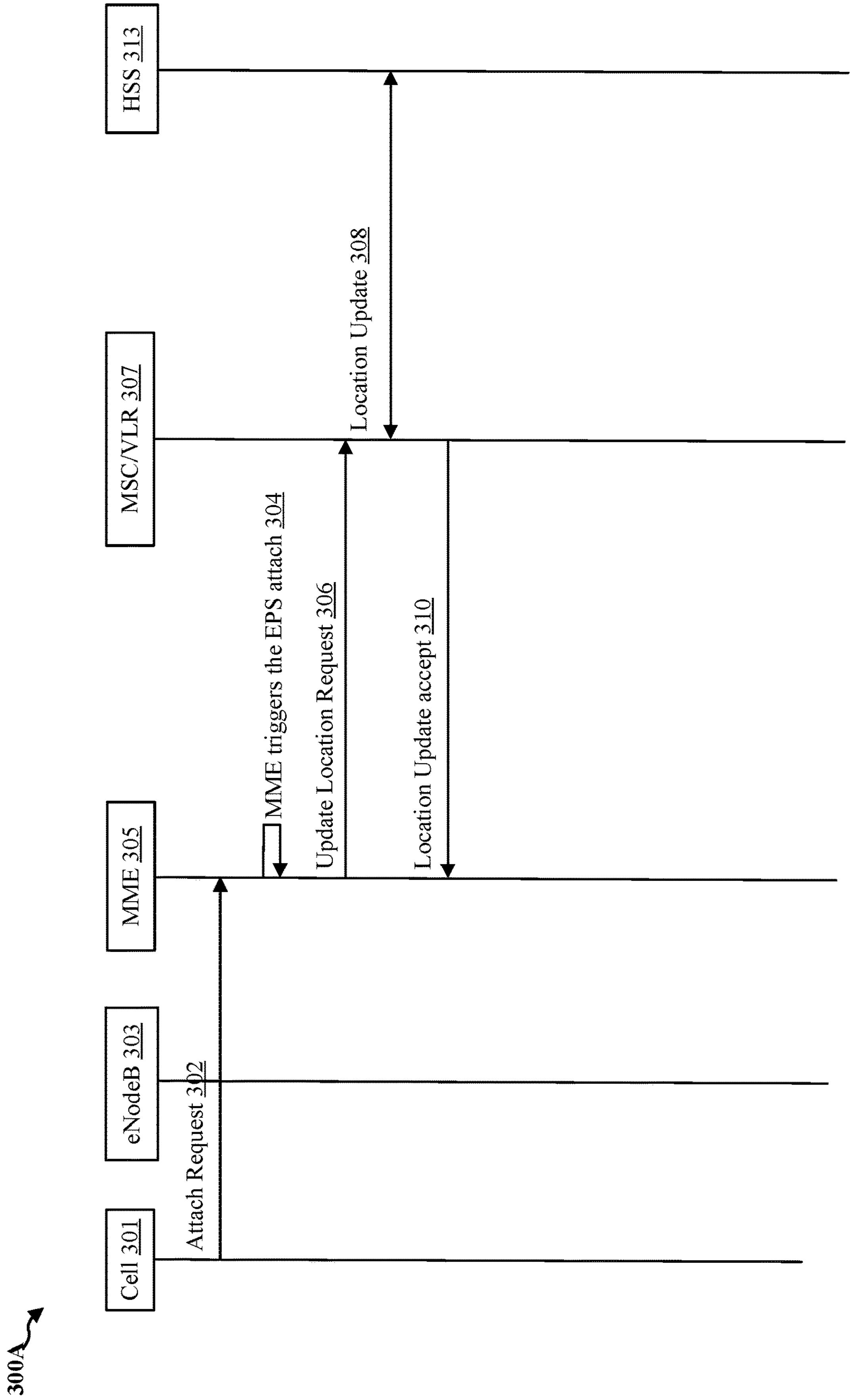
FIGS. 3A-B are call flow diagrams of example identification processes between an identification system and a wireless device according to an embodiment.

FIG. 3A is a call flow diagram of an example identification process between an identification system and a wireless device according to an embodiment. Specifically, example 300A from FIG. 3A shows an identification process for a wireless device using an Attach Procedure. The goal of the Attach Procedure is to register a cellular device 301 to the network such that the cellular device 301 is able to register with the network to receive services. Accordingly, the identification system will invoke the Attach Procedure to obtain electronic identifiers, via an update location, from the cellular device 301.

At step 302, the cellular device 301 sends an “Attach Request” to the Mobile Management Entity (MME) 305. This includes the GUTI of the cellular device 301 received from the last attach, and the Access Point Name (APN) that the cellular device 301 would like to connect to. At this point, the identification system may have already obtained an electronic identifier since the Attach Request contains the IMSI information of the cellular device 301.

At step 304, the MME 305 triggers an EPS attach.

At step 306, the MME 305 sends an update location request, which includes the MME ID of the MME 305, to the MSC/VLR 307.

At step 308, the HSS and the MSC/VLR 307 exchange location updates. This is done because the HSS 313 should always know which MME 305 is currently serving the cellular device 301. In addition, the HSS 313 provides the MME 305 with cellular device subscription information, including the PDNs that the cellular device 301 is allowed to access.

At step 310, the MSC/VLR 307 sends an location update accept 310 to the MME 305.

Figure 3B:
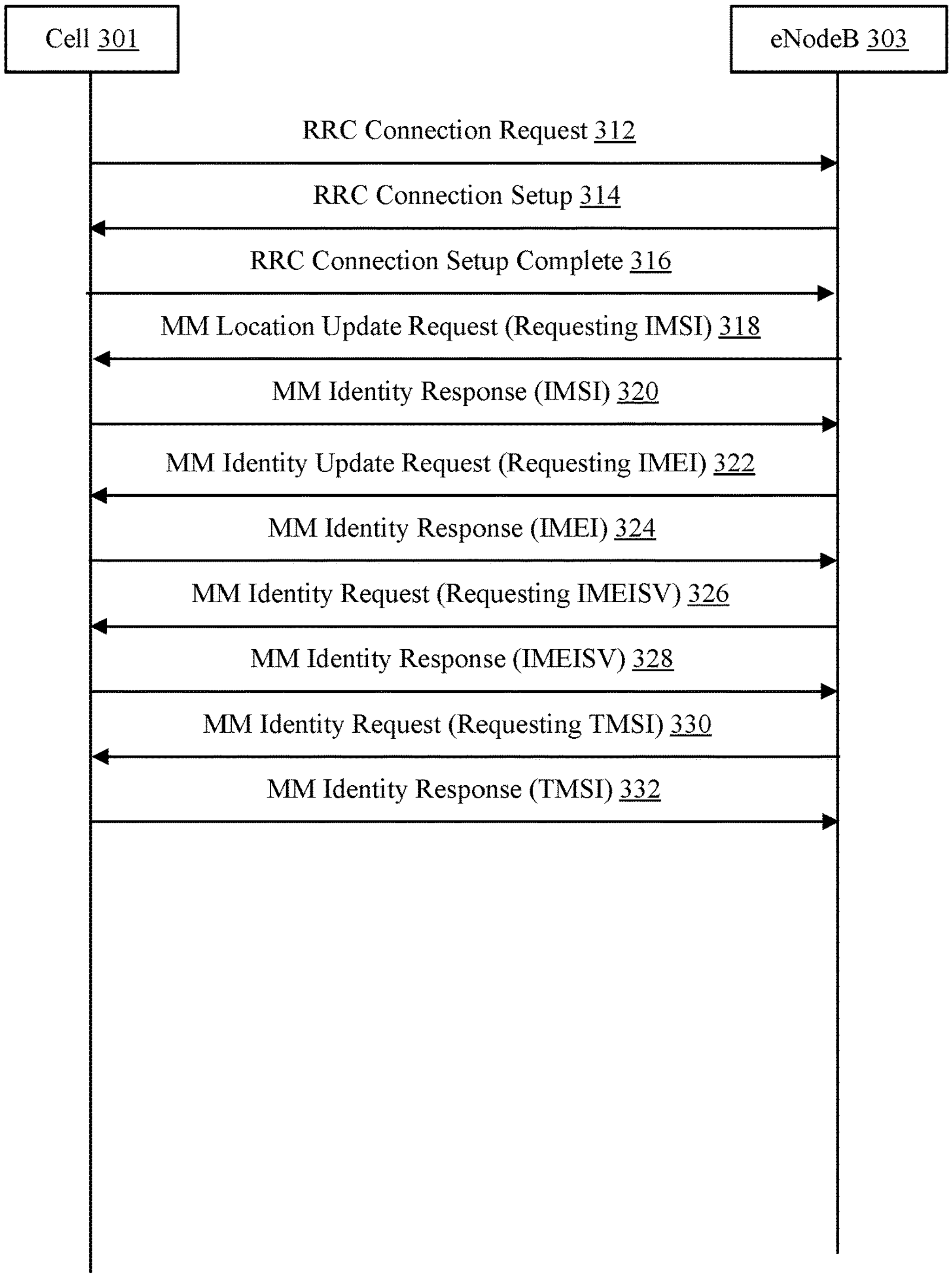

FIG. 3B is a call flow diagram of an example identification process between an identification system and a wireless device according to an embodiment. Specifically, example 300B from FIG. 3B shows an identification process for a wireless device using a LAC update timer.

At step 312, the cellular device 301 transmits a RRC connection request to the eNodeB 303. At step 314, the eNodeB 303 responds with a RRC connection Setup. At step 316, the cellular device 301 transmit a RRC connection setup complete.

At step 318, the eNodeB 303 transmits a MM location update request to request the IMSI of the cellular device 301.

At step 320, the cellular device 301 responds with an MM identity response which includes the IMSI. The IMSI is an electronic identifier that can be used to identify the cellular device 301.

At step 322, the eNodeB 303 transmits a MM identity request to request the IMEI of the cellular device 301. At step 324, the cellular device 301 responds with a MM identity response that includes the IMEI. The IMSI is another electronic identifier that can be used to identify the cellular device 301.

At step 326, the eNodeB 303 transmits a MM identity request to request the international mobile station equipment identity software version (IMEISV) of the cellular device 301. At step 328, the cellular device 301 responds with a MM identity response that includes the IMEISV. The IMEISV is a code that identifies the mobile phone and the version of its software.

At step 330, the eNodeB 303 transmits a MM identity request to request the temporary identification number (TMSI) of the cellular device 301. At step 332, the cellular device 301 responds with a MM identity response that includes the TMSI. The TMSI is a temporary identification number that is used in a GSM network instead of the IMSI to ensure the privacy of the mobile subscriber.

When the cellular device 301 sends the MM location update request, it also starts an LAC timer. The eNodeB 303 ignores this request. If the cellular device 301 does not receive a valid response to the MM location update request within a predetermined time, then the cellular device 301 may resend the MM location update request. This process is repeated a few times and then the cellular device 301 aborts the connection.

Thus, by sending a series of three MMI identity request immediately after the RRC connection is established and before the cellular device 301 aborts the connection, the eNodeB 303 can receive the MM Identity Response messages from the cellular device 301 without requiring integrity protection.

Once the identity information has been collected, the eNodeB 303 rejects the location update request thus preventing the cellular device 301 from repeatedly trying to camp on the eNodeB 303.

Although there may be many different ways to obtain electronic identifiers such as obtaining a location update from a cellular device. It should be noted that this disclosure is not limited to the specific procedures to obtain electronic identifiers. Instead, the disclosure describes the specific procedures for illustrative purposes only.

Figure 4:
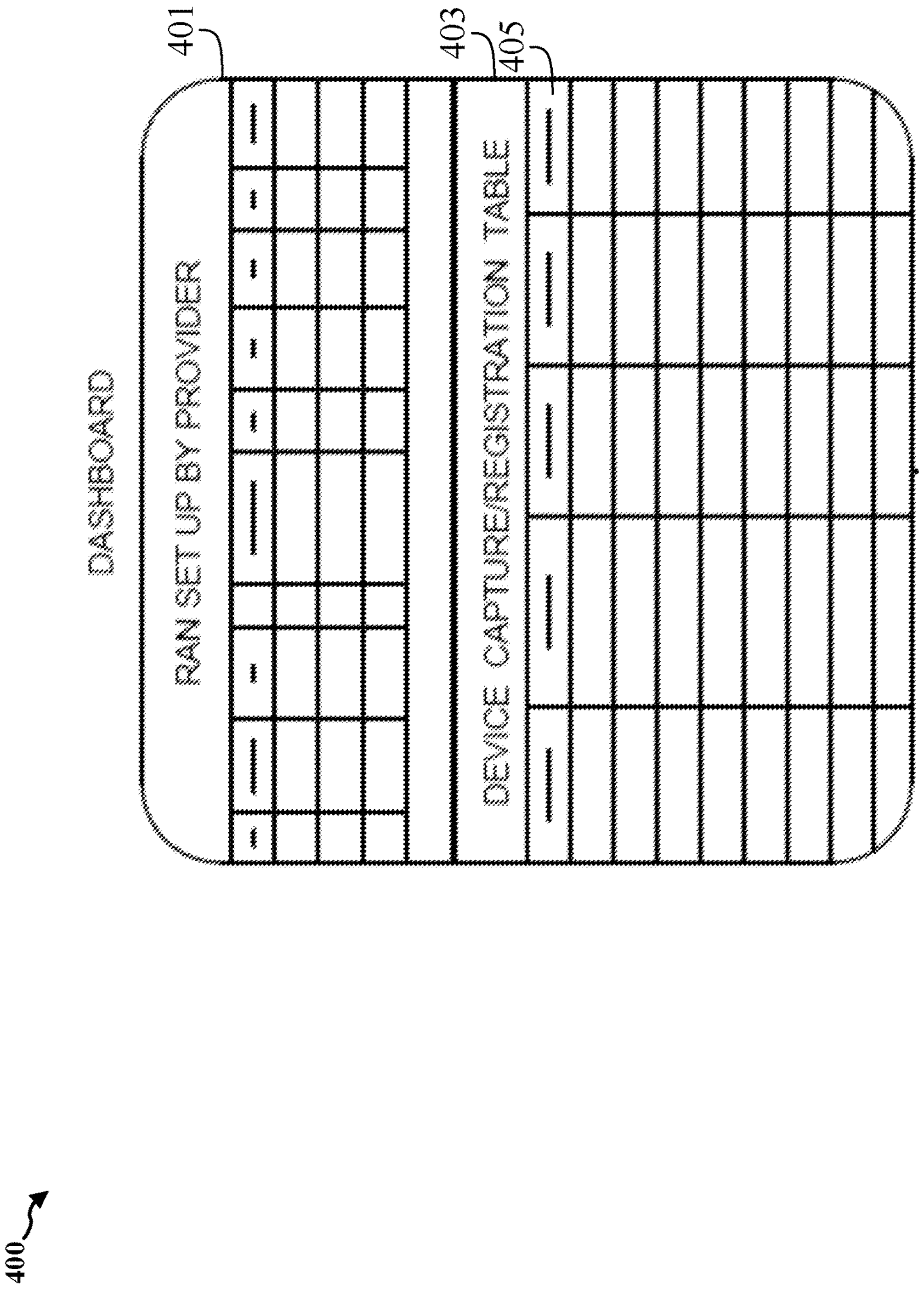
FIG. 4 is an example of a dashboard UI according to some embodiments.

FIG. 4 is an example of a dashboard UI according to some embodiments. As shown in example 400, the dashboard UI may list a RAN set up table 401 and/or Device Capture/Registration Table 403. In some examples, the RAN set up table 401 lists all the different radio access networks and different telecommunication carriers emulated by a base station. In some examples, the Device Capture/Registration Table lists each cellular device placed inside the shielded box that undergoes the identification process. In some examples, an operator of the identification system may click into an entry on the Device Capture/Registration Table 403 to navigate to a profile UI for the particular cellular device for an entry 405.

It should be noted that this disclosure is not limited to the specific configuration or any other specific table layout. Instead, the disclosure describes the specific columns and rows embodiment for illustrative purposes only. The RAN set up table 401 and the Device Capture/Registration Table 403 may contain any number of rows, columns, or any other configuration.

Figure 5:
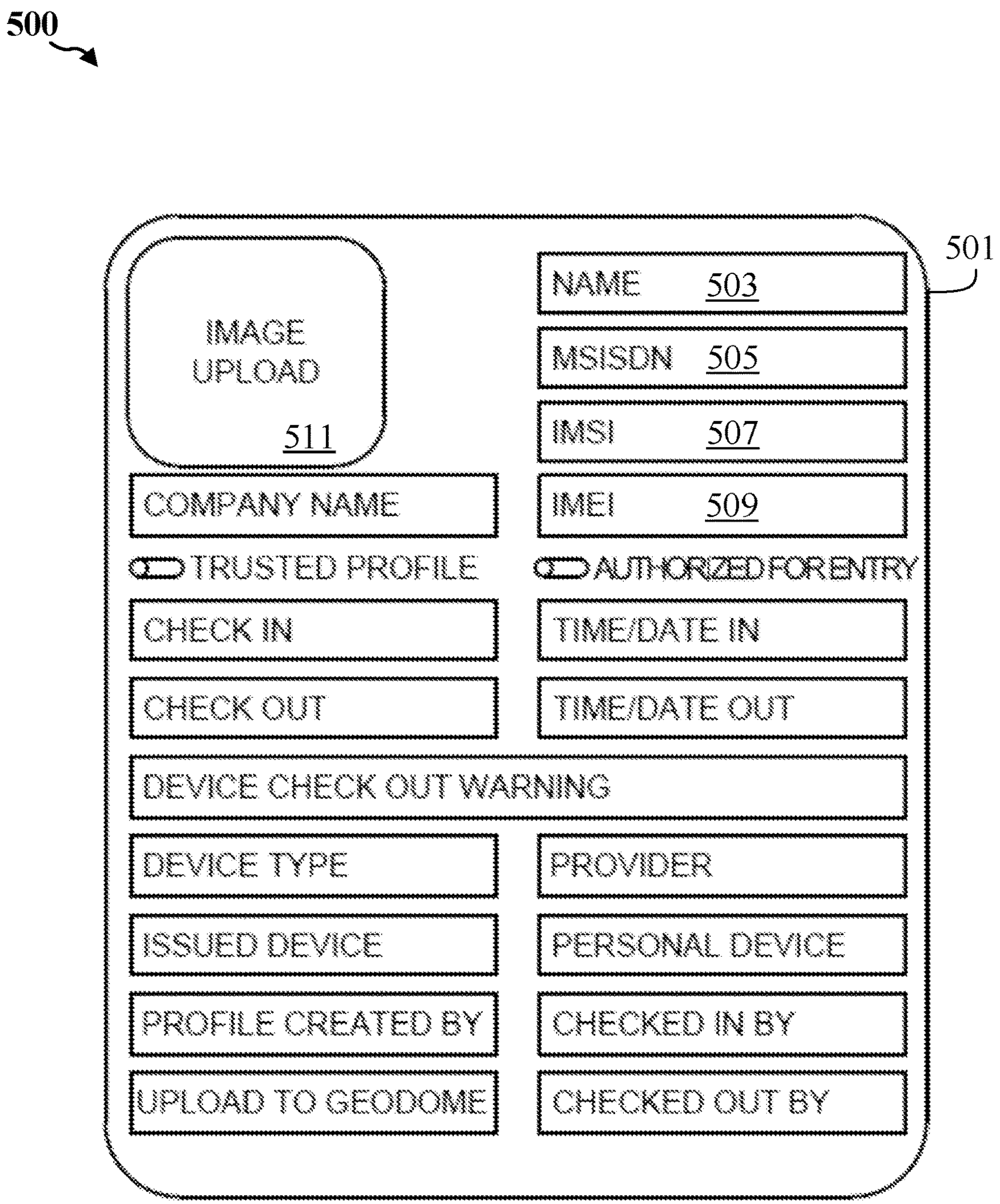
FIG. 5 is an example of a profile UI according to some embodiments.

FIG. 5 is an example of a profile UI according to some embodiments. As shown in example 500, the profile UI 501 may list identify, registration, or check in information related to a profile for a particular cellular device. For example, the profile UI 501 may include at least one of a name of an owner of the cellular device 503, the MSISDN 505, the IMSI 507, the IMEI 509, and the image of the owner of the cellular device 511.

It should be noted that this disclosure is not limited to the specific information fields or any other specific UI layout. Instead, the disclosure describes the specific information fields in the profile UI 501 for illustrative purposes only. The profile UI 501 may contain any number of information fields, or any other configuration.

Figure 6:
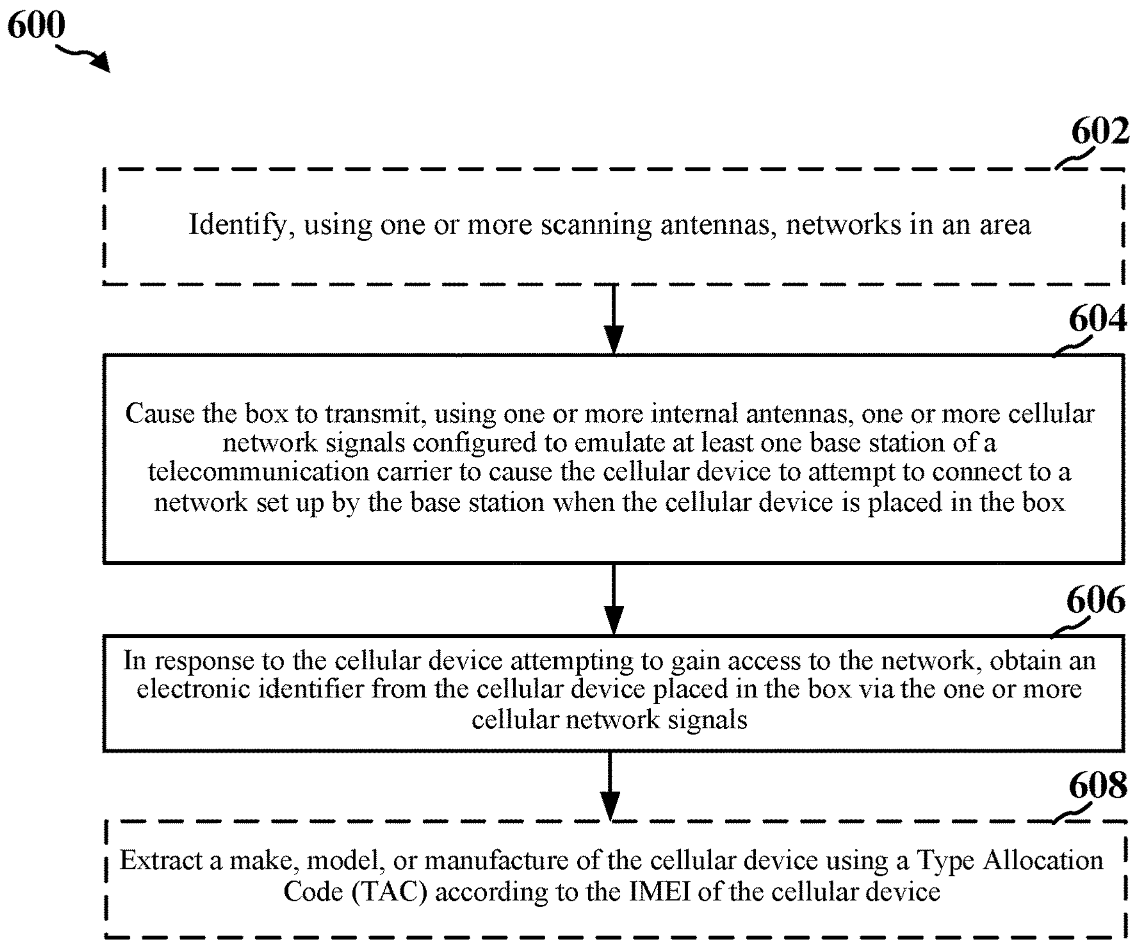
FIG. 6 is flowchart example of an example method of identifying cellular devices using an identification system according to an embodiment.

FIG. 6 is flowchart example of an example method of identifying cellular devices using an identification system according to an embodiment. The method 600 may be performed by one or more processor and/or at a base station (e.g., 103, 205) or a virtual base station of an identification system (e.g., 101, 200), another wireless communications apparatus (e.g., the apparatus 902), or one or more components thereof. Optional aspects are illustrated in dashed lines. According to various different aspects, one or more of the illustrated methods 600 may be omitted, transposed, and/or contemporaneously performed. This method 600 allows for identification of cellular device by causing the cellular device to transmit an electronic identifier when attempting to connect to a network set up by the base station after the cellular device is placed in a shielded box.

Optionally, at operation 602, the method 600 may include identifying, using one or more scanning antennas, networks in an area. In some examples, the networks may be identified by performing a radio scan that is able to detect and decode wireless signals. This allows the identification system 100 to periodically scan networks to determine whether there has been any changes in the RF footprint for commercial carriers.

At operation 604, the method 600 may include causing a box to transmit, using the one or more internal antennas, one or more cellular network signals configured to emulate at least one base station of a telecommunication carrier to cause the cellular device to attempt to connect to a network set up by the base station when the cellular device is placed in the box. In some examples, the one or more cellular network signals are determined based on the identified networks. In some examples, the box may be a Faraday cage.

Placing the cellular device into the box creates an environment where the cellular device is electronically isolated from electromagnetic waves or RF waves and will cause the cellular device to perform an attach procedure and/or a location update since the box.

In some examples, the one or more cellular signals are transmitted on one or more radio access technologies (RAT) to cause the cellular device to attempt to connect to a network set up by the base station. This means that the one or more cellular signals may transmit on all technologies to cover all RATs.

At operation 606, the method 600 may include obtaining, in response to the cellular device attempting to gain access to the network, an electronic identifier from the cellular device placed in the box via the one or more cellular network signals. In some examples, the electronic identifiers comprises at least one of a IMSI or an IMEI.

As an example, referring back to FIGS. 3A-3B, the cellular device will transmit electronic identifiers when attempting to connect to a network provided by the identification system.

The IMEI is a numeric identifier that is unique for 3GPP mobile phones and some satellite phones. GSM networks use the IMEI number to identify valid devices and stop a stolen phone from accessing the network. In particular, an IMEI number may be used as an input for tracking devices that are then able to locate a mobile phone within an accuracy of a few meters.

In some examples, such as in 2G/3G/4G/5G networks, the IMSI may be detected. IMSI comprises country code, wireless provider code, and phone number of the device. In some examples, an IMSI catcher may force the wireless device to respond with its specific location using GPS or the signal intensities of the wireless device's adjacent cell towers, allowing trilateration based on the known locations of the towers.

For example, a 5G registration request message is used by a cellular device to identify itself to the 5G network provided by a base station of the identification system when initiating registration. The registration request message includes the cellular device's IMSI or other unique identifier, such as Temporary Mobile Subscriber Identity (TMSI) or a 5G Globally Unique Temporary Identity (5G-GUTI).

Optionally, at operation 608, the method 600 may include extracting a make, model, or manufacture of the cellular device using a Type Allocation Code (TAC) according to the IMEI of the cellular device.

Figure 7:
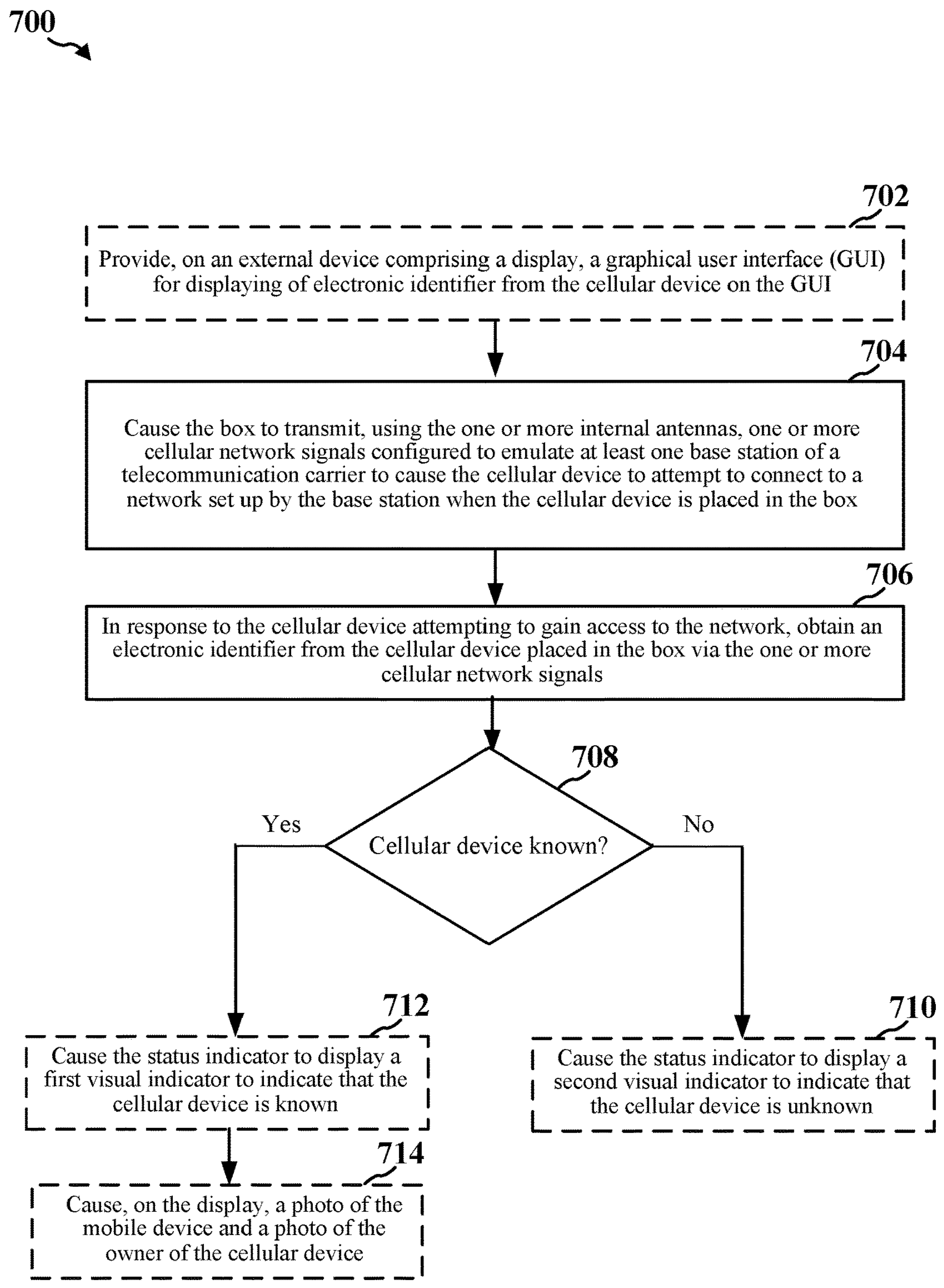
FIG. 7 is flowchart example of an example method of identifying cellular devices using an identification system according to an embodiment.

FIG. 7 is flowchart example of an example method of identifying cellular devices using an identification system according to an embodiment. The method 700 may be performed by or at a base station (e.g., 103, 205) of an identification system (e.g., 101, 200), another wireless communications apparatus (e.g., the apparatus 902), or one or more components thereof. Optional aspects are illustrated in dashed lines. According to various different aspects, one or more of the illustrated methods 700 may be omitted, transposed, and/or contemporaneously performed. This method 700 allows for a determination of whether the identified cellular device is known or not using an identification system.

Optionally, at operation 702, the method 700 may include providing, on an external device comprising a display, a graphical user interface (GUI) for displaying the electronic identifier from the cellular device on the GUI. As an example, referring to FIG. 5, a profile UI 501 for a cellular device may include at least the IMSI 507 or the IMEI 509.

At operation 704, the method 700 may include causing the box to transmit, using the one or more internal antennas, one or more cellular network signals configured to emulate at least one base station of a telecommunication carrier to cause the cellular device to attempt to connect to a network set up by the base station when the cellular device is placed in the box. The one or more cellular network signals may be determined based on the identified networks.

At operation 706, the method 700 may include, in response to the cellular device attempting to gain access to the network, obtaining an electronic identifier from the cellular device placed in the box via the one or more cellular network signals.

At operation 708, the method 700 may include determining whether the cellular device is known based on checking electronic identifiers from a database of known devices stored on an external device or on a cloud.

This allows the method 700 to be integrated with a cellular device registration system and/or reliably determine whether the electronic identifiers are known as authorized devices or not.

If the cellular device is known, then, optionally at operation 712, the method 700 may include causing the status indicator to display a first visual indicator to indicate that the cellular device is known. In some examples, the first visual indicator may be a green light to provide a quick visual cue to the operator that the cellular device is known.

Optionally, at operation 714, the method 700 may further include causing, on a display, a photo of the cellular device and a photo of a user of the cellular device. This may help the operator to match the cellular device to its correct owner.

If the cellular device is not known, then, optionally at operation 710, the method 700 may include causing a status indicator on the box to display a second visual indicator to indicate that the cellular device is unknown. In some examples, the second visual may be a red light to provide an quick visual cue to the operator that the cellular device is unknown.

Figure 8:
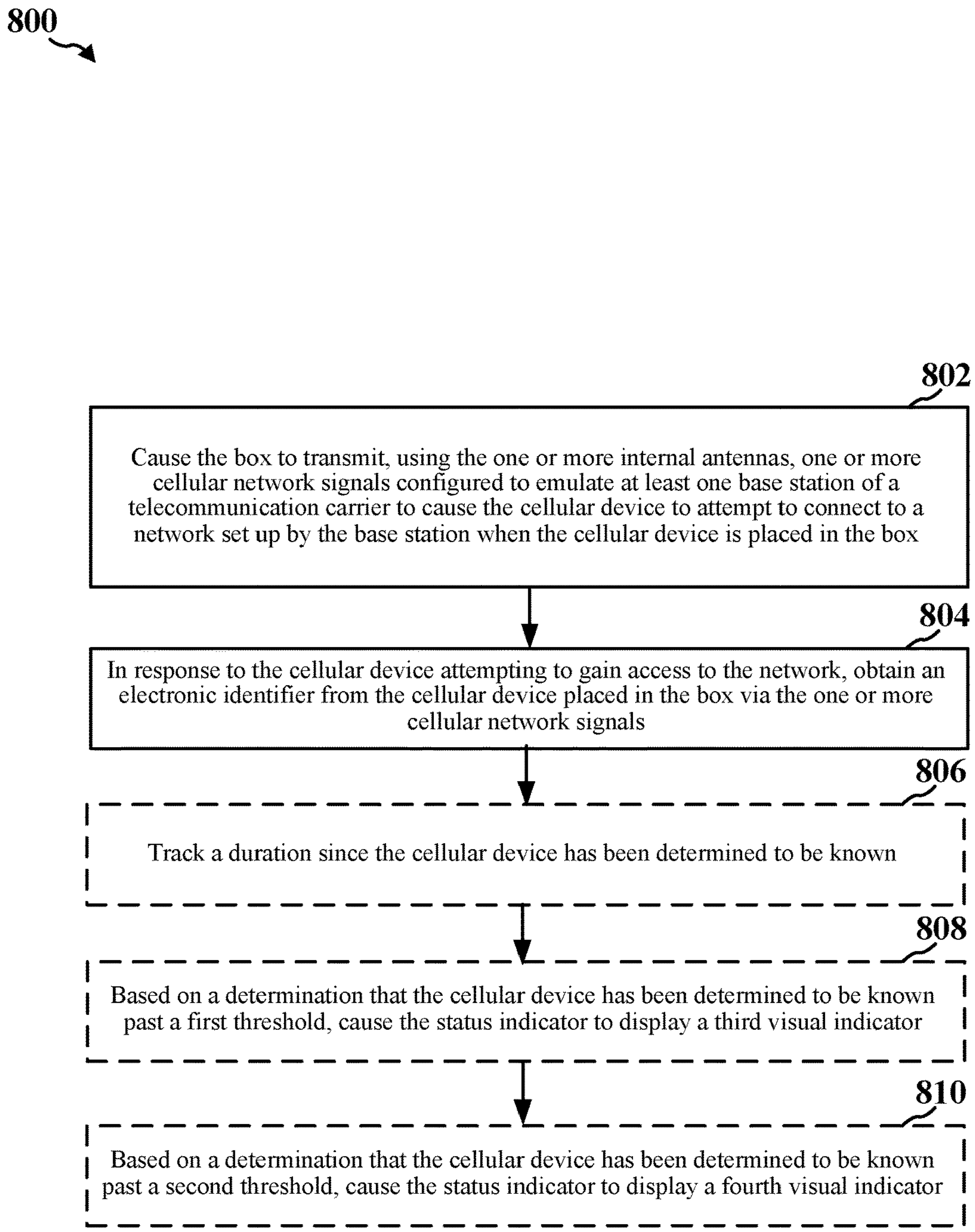
FIG. 8 is flowchart example of an example method of identifying cellular devices using an identification system according to an embodiment.

FIG. 8 is flowchart example of an example method of identifying cellular devices using an identification system according to an embodiment. The method 800 may be performed by or at a base station (e.g., 103, 205) of an identification system (e.g., 101, 200), another wireless communications apparatus (e.g., the apparatus 902), or one or more components thereof. Optional aspects are illustrated in dashed lines. According to various different aspects, one or more of the illustrated methods 800 may be omitted, transposed, and/or contemporaneously performed. This method 800 allows for a determination of how long an identified cellular device has been inside a secured facility using an identification system.

At operation 802, the method 800 may include causing the box to transmit, using the one or more internal antennas, one or more cellular network signals configured to emulate at least one base station of a telecommunication carrier to cause the cellular device to attempt to connect to a network set up by the base station when the cellular device is placed in the box, wherein the one or more cellular network signals are determined based on the identified networks.

At operation 804, the method 800 may include obtaining, in response to the cellular device attempting to gain access to the network, an electronic identifier from the cellular device placed in the box via the one or more cellular network signals.

Optionally, at operation 806, the method 800 may include tracking a duration since the cellular device has been determined to be known. For example, if the method 800 is being used in a secured facility, an operator of an identification system may want to track how long a cellular device has been inside the secured facility after being properly identified or "checked" in. As an example, if the secured facility is a correctional facility, then an operator of the identification system may want to prevent a correctional officer or staff from bringing an authorized cellular device into the correctional facility and leaving the authorized cellular device inside the correctional facility with an inmate.

Optionally, at operation 808, the method 800 may include based on a determination that the cellular device has been determined to be known past a first threshold, cause a status indicator on the box to display a third visual indicator. For example, following the correctional facility example discussed above, the first threshold may be eight hours, which is the typical length of time of a shift for a correctional officer. Accordingly, if the cellular device is still inside the correctional facility after a length of a typical shift then the cellular device may be flagged as suspicious since this is suspicious behavior.

Optionally, at operation 810, the method 800 may include based on a determination that the cellular device has been taken out of the box past a second threshold, cause a status indicator on the box to display a fourth visual indicator. As an example, expanding upon the correctional facility example, the second threshold may be twelve hours. Accordingly, if the cellular device is still inside the correctional facility after an entire day then the cellular device may be flagged as a warning. In some examples, the method 800 may include using the electronic identifiers to locate or track the cellular phone.

Figure 9:
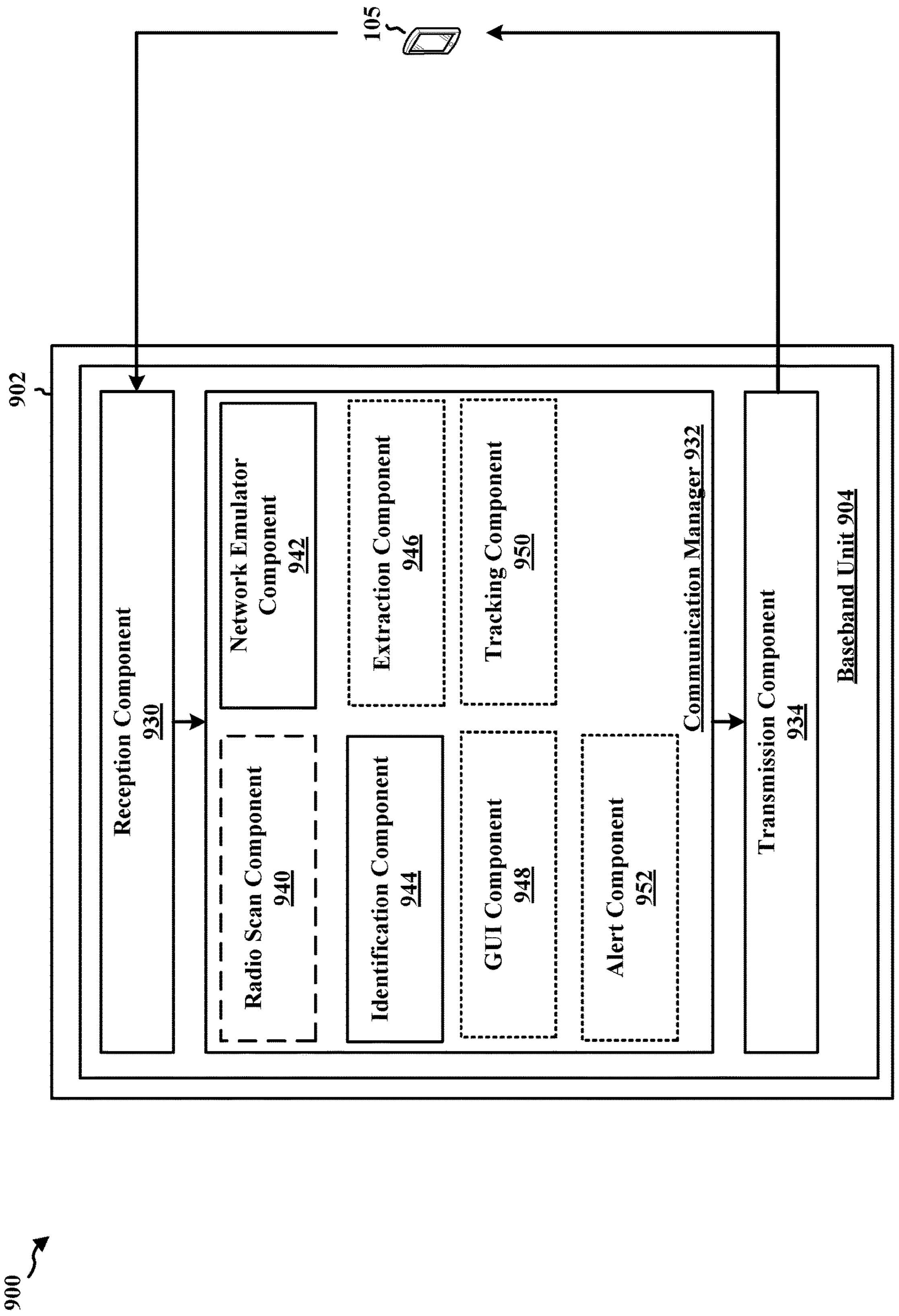
FIG. 9 is a diagram illustrating an example of a hardware implementation for an apparatus according to an embodiment.

FIG. 9 is a diagram 900 illustrating an example of a hardware implementation for an apparatus 902. The apparatus 902 may include a base station and includes a baseband unit 904. The baseband unit 904 may communicate through a cellular RF transceiver with the cellular devices 105, 207, which may include one or more VUEs and/or PUEs. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a radio scan component 940, a network emulator component 942, an identification component 944, an extraction component 946, a GUI component 948, a tracking component 950, an alert component 952, and a transmission component 934. The communications manager 932 includes the one or more illustrated components. The components within the communications manager 932 may be stored in the computer-readable medium/memory and/or configured as hardware within the baseband unit 904. The baseband unit 904 may be a component of the identification system 100 and may include the memory and/or at least one of the TX processor, the RX processor, and the controller/processor.

Optionally, the communications manager 932 may include a radio scan component 940 that is configured to identify wireless networks in a radio, e.g., as described in connection with operation 602 of FIG. 6. The communications manager 932 also includes a network emulator component 942 that is configured to cause the box to transmit, using the one or more internal antennas, one or more cellular network signals configured to emulate at least one base station of a telecommunication carrier to cause the cellular device 105 to attempt to connect to a network set up by the base station of an apparatus 902 when the cellular device 105 is placed in the box, e.g., as described in connection with operation 604 of FIG. 6. The communications manager 932 also includes an identification component 944 that is configured to obtain, in response to the cellular device attempting to gain access to the network, an electronic identifier from the cellular device placed in the box via the one or more cellular network signals, e.g., as described in connection with operation 606 of FIG. 6. Optionally, the communications manager 932 also includes an extraction component 946 that is configured to extract a make, model, or manufacture of the cellular device using a Type Allocation Code (TAC) according to the IMEI of the cellular device, e.g., as described in connection with operation 608 of FIG. 6. Optionally, the communications manager 932 also includes an GUI component 948 that is configured to provide, on an external device comprising a display, a graphical user interface (GUI) for displaying the electronic identifier from the cellular device on the GUI, e.g., as described in connection with operations 702 and 714 of FIG. 7. Optionally, the communications manager 932 also includes a tracking component 950 that is configured to track a duration since the cellular device has been determined to be known, e.g., as described in connection with operation 806 of FIG. 8. Optionally, the communications manager 932 also includes an alert component 952 that is configured to cause a status indicator on the box to display visual indicator, e.g., as described in connection with operation 808 and 810 of FIG. 8.

The apparatus may include additional components that perform each of the blocks of the algorithm in the aforementioned flowchart and timing diagram of FIGS. 2 and 6-8. As such, each block in the aforementioned flowchart and timing diagram of FIGS. 2 and 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The benefits of the subject matter claimed herein are immediately apparent. One of many advantages is that the identification system provides a simple and reliable way to verify an identity of cellular devices using their electronic identifiers. This eliminates the need for a contractor to actively monitor and detect wireless devices, as in conventional solutions. In addition, a sophisticated user is also not needed to operate the identification system. This alone can save the facility significant expenditures. No manpower is required (other than deploying the identification system and having an operator operate a simple UI) because an operator of the system simply has to place a cellular device inside of the shielded box and press a button to operate the identification process.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims. Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for identifying cellular devices comprising:

a box configured to provide an electronically isolated environment by blocking electromagnetic waves or radio frequency (RF) waves such that a cellular device is electronically isolated from outside the box when placed in the box, wherein the box comprises one or more internal antennas;

a base station coupled to the box via one or more RF cables, wherein the base station comprises one or more scanning antennas; and one or more processors configured to:

cause the box to transmit, using the one or more internal antennas, one or more cellular network signals configured to emulate at least one base station of a telecommunication carrier to cause the cellular device to connect to a network set up by the base station when the cellular device is placed in the box, and obtain, in response to the cellular device attempting to gain access to the network, an electronic identifier from the cellular device via the one or more cellular network signals.

2. The apparatus of claim 1, wherein the electronic identifier comprises at least one of an international mobile subscriber identity (IMSI), an international mobile equipment identity (IMEI), Temporary Mobile Subscriber Identity (TMSI), or a 5G Globally Unique Temporary Identity (5G-GUTI).

3. The apparatus of claim 2, wherein the one or more processors are further configured to:

extract a make, model, or manufacture of the cellular device using a Type Allocation Code (TAC) according to the IMEI of the cellular device.

4. The apparatus of claim 1, wherein the one or more processors are further configured to:

identify, using the one or more scanning antennas, networks in an area of interest, wherein the one or more cellular network signals are determined based on the identified networks, wherein the one or more cellular signals are transmitted on one or more radio access technologies (RAT) to cause the cellular device to connect to a network set up by the base station.

5. The apparatus of claim 1, wherein the one or more processors are further configured to:

provide, on an external device comprising a display, a graphical user interface (GUI) for displaying the electronic identifier from the cellular device on the GUI.

6. The apparatus of claim 1, wherein the one or more processors are further configured to:

determine whether the cellular device is known or unknown according to a database of known devices stored on an external device or on a cloud, and based on a determination that the cellular device is known, cause a status indicator to display a first visual indicator to indicate that the cellular device is known.

7. The apparatus of claim 1, wherein the one or more processors are further configured to:

determine whether the cellular device is known or unknown according to a database of known devices stored on an external device or on a cloud, and based on a determination that the cellular device is known, cause, on a display, a photo of a user of the cellular device.

8. The apparatus of claim 1, wherein the one or more processors are further configured to:

determine whether the cellular device is known or unknown according to a database of known devices, and based on a determination that the cellular device is unknown, cause a status indicator on display a second visual indicator to indicate that the cellular device is unknown.

9. The apparatus of claim 6, wherein the one or more processors are further configured to:

track a duration since the cellular device has been determined to be known, and based on a determination that the cellular device has been determined to be known past a first threshold, cause a status indicator to display a third visual indicator.

10. The apparatus of claim 6, wherein the one or more processors are further configured to:

track a duration since the cellular device has been placed in the box, and based on a determination that the cellular device has been determined to be known past a second threshold, cause a status indicator to display a fourth visual indicator.

11. The apparatus of claim 1, wherein the box comprises a faraday cage.

12. An apparatus for identifying cellular devices comprising:

a box configured to provide an electronically isolated environment by blocking electromagnetic waves or radio frequency (RF) waves such that a cellular device is electronically isolated from outside the box when placed in the box, wherein the box comprises one or more internal antennas;

one or more scanning antennas; and one or more processors configured to:

generate a virtual base station configured to emulate at least one base station of a telecommunication carrier;

cause the box to transmit, using the one or more internal antennas, one or more cellular network signals configured to cause the cellular device to connect to a network set up by the virtual base station when the cellular device is placed in the box, and obtain, in response to the cellular device attempting to gain access to the network, an electronic identifier from the cellular device placed in the box via the one or more cellular network signals.

13. The apparatus of claim 12, wherein the electronic identifier comprises at least one of an international mobile subscriber identity (IMSI), an international mobile equipment identity (IMEI), Temporary Mobile Subscriber Identity (TMSI), or a 5G Globally Unique Temporary Identity (5G-GUTI).

14. The apparatus of claim 12, wherein the one or more processors are further configured to:

identify, using the one or more scanning antennas, networks in an area, wherein the one or more cellular network signals are determined based on the identified networks, wherein the one or more cellular signals are transmitted on one or more radio access technologies (RAT) to cause the cellular device to connect to a network set up by the base station.

15. The apparatus of claim 12, wherein the one or more processors are further configured to:

provide, on an external device comprising a display, a graphical user interface (GUI) for displaying the electronic identifier from the cellular device on the GUI.

16. The apparatus of claim 12, wherein the one or more processors are further configured to:

determine whether the cellular device is known or unknown according to a database of known devices stored on an external device or on a cloud, and based on a determination that the cellular device is known, cause a status indicator to display a first visual indicator to indicate that the cellular device is known.

17. The apparatus of claim 12, wherein the one or more processors are further configured to:

determine whether the cellular device is known or unknown according to a database of known devices stored on an external device or on a cloud, and based on a determination that the cellular device is known, cause, on a display, a photo of a user of the cellular device.

18. The apparatus of claim 12, wherein the one or more processors are further configured to:

determine whether the cellular device is known or unknown according to a database of known devices, and based on a determination that the cellular device is unknown, cause a status indicator to display a second visual indicator to indicate that the cellular device is unknown.

19. The apparatus of claim 17, wherein the one or more processors are further configured to:

track a duration since the cellular device has been placed in the box, and based on a determination that the cellular device has been placed in the box past a first threshold, cause a status indicator on the box to display a third visual indicator.

20. A method for identifying cellular devices, comprising:

receiving a cellular device in a box configured to provide an electronically isolated environment by blocking electromagnetic waves or radio frequency (RF) waves such that a cellular device is electronically isolated from outside the box when placed in the box, wherein the box comprises one or more internal antennas;

generating a virtual base station configured to emulate at least one base station of a telecommunication carrier;

causing the box to transmit, using the one or more internal antennas from the box, one or more cellular network signals configured to cause the cellular device to connect to a network set up by the virtual base station when the cellular device is placed in the box, and obtaining, in response to the cellular device attempting to gain access to the network, an electronic identifier from the cellular device placed in the box via the one or more cellular network signals.

21. The apparatus of claim 1, wherein the base station is located outside of the box.

22. The apparatus of claim 12, wherein the base station is located outside of the box.

23. The method of claim 20, wherein the base station is located outside of the box.

* * * * *